US011843267B2

(12) United States Patent
Ono et al.

(10) Patent No.: US 11,843,267 B2
(45) Date of Patent: **\*Dec. 12, 2023**

(54) BATTERY CONTROL UNIT AND BATTERY SYSTEM

(71) Applicant: Yazaki Corporation, Tokyo (JP)

(72) Inventors: Chihiro Ono, Susono (JP); Takahiro Syouda, Susono (JP)

(73) Assignee: YAZAKI CORPORATION, Tokyo (JP)

( \* ) Notice: Subject to any disclaimer, the term of this patent is extended or adjusted under 35 U.S.C. 154(b) by 161 days.

This patent is subject to a terminal disclaimer.

(21) Appl. No.: 17/343,151

(22) Filed: Jun. 9, 2021

(65) Prior Publication Data

US 2021/0399557 A1 Dec. 23, 2021

(30) Foreign Application Priority Data

Jun. 19, 2020 (JP) ................................. 2020-106011

(51) Int. Cl.
*H01M 10/44* (2006.01)
*H02J 7/00* (2006.01)
*H02J 7/04* (2006.01)

(52) U.S. Cl.
CPC .......... *H02J 7/0024* (2013.01); *H01M 10/44* (2013.01); *H02J 7/0016* (2013.01); *H02J 7/0048* (2020.01); *H02J 7/007182* (2020.01); *H02J 7/04* (2013.01)

(58) Field of Classification Search
CPC .. H02J 7/0024; H02J 7/0048; H02J 7/007182; H02J 7/0016; H02J 7/04; H01M 10/44
See application file for complete search history.

(56) References Cited

U.S. PATENT DOCUMENTS

2006/0087291 A1\* 4/2006 Yamauchi ............. H02J 7/0069
320/137
2007/0170896 A1\* 7/2007 Proebstle .............. H02J 7/1446
322/37

(Continued)

FOREIGN PATENT DOCUMENTS

JP 2002272010 A \* 9/2002
JP 2013-31249 A 2/2013
WO WO-2014156041 A1 \* 10/2014 .......... H01M 10/441

OTHER PUBLICATIONS

JP-2002272010-A Machine Translation; 2002 (Year: 2002).\*
WO-2014156041-A1 Machine Translation; 2014 (Year: 2014).\*

*Primary Examiner* — Drew A Dunn
*Assistant Examiner* — Pamela J Jeppson
(74) *Attorney, Agent, or Firm* — Sughrue Mion, PLLC

(57) ABSTRACT

A battery control unit includes a switching unit, a system controller, and a control unit. The switching unit switches between a connection state in which the corresponding battery is discharged and a non-connection state in which the corresponding battery is not discharged. The system controller limits a discharge current flowing through the battery in the connection state so as not to exceed a minimum discharge current limitation value that is smallest among discharge current limitation values. The control unit switches to the non-connection state in order from the battery having the minimum discharge current limitation value before the discharge current limitation unit limits the discharge current. Further, the control unit switches all the batteries to the connection state after the batteries in the connection state becomes one, and then switch the battery to the non-connection state in order from the battery determined to reach a discharge termination state.

9 Claims, 8 Drawing Sheets

(56) References Cited

U.S. PATENT DOCUMENTS

| | | | | |
|---|---|---|---|---|
| 2009/0251100 A1* | 10/2009 | Incledon | ............... | H02J 7/0016 |
| | | | | 320/137 |
| 2012/0094150 A1* | 4/2012 | Troutman | ............. | H01M 50/51 |
| | | | | 429/61 |
| 2013/0320992 A1* | 12/2013 | Andersson | ........... | G01R 31/382 |
| | | | | 324/434 |
| 2015/0028817 A1* | 1/2015 | Brockerhoff | .......... | H01M 10/02 |
| | | | | 429/61 |
| 2016/0218525 A1* | 7/2016 | Takao | ..................... | H02J 7/005 |
| 2019/0322193 A1* | 10/2019 | Duan | ..................... | B60L 58/20 |

\* cited by examiner

BATTERY CONTROL UNIT AND BATTERY SYSTEM

CROSS-REFERENCE TO RELATED APPLICATIONS

This application is based on and claims priority under 35 USC 119 from Japanese Patent Application No. 2020-106011 filed on Jun. 19, 2020, the contents of which are incorporated herein by reference.

TECHNICAL FIELD

The present invention relates to a battery control unit and a battery system.

BACKGROUND ART

There is a battery system configured by connecting a plurality of batteries in series. Deterioration of the plurality of batteries varies due to, for example, a variation in manufacturing or a variation in an operating environment. For example, a battery that is close to a heat source rapidly deteriorates, while a battery that is remote from the heat source slowly deteriorates.

For this reason, a battery that has deteriorated during charging and discharging reaches a charge and discharge termination state first. In this case, even when there is remaining capacity in other batteries, charging and discharging must be stopped and a battery capacity cannot be used up. Therefore, a system has been proposed in which a battery that has reached a charge termination state is bypassed and disconnected from a charging circuit, and charging of a battery that has not reached the charge termination state is continued (Patent Literature 1). Similarly, during discharging, a battery system may be considered in which a battery that has reached a discharge termination state is bypassed and disconnected from discharging, and discharging of the battery that has not reached the discharge termination state is continued.

Incidentally, in order to prevent deterioration of the battery, it is considered to perform discharge current limitation for limiting a discharge current when a charge state of the battery becomes low. When the discharge current is limited, for example, in the case of an electric vehicle, limitation is imposed such that acceleration is weakened even when an accelerator is depressed.

When such discharge current limitation is adopted in the battery system, the following problem occurs. For example, a battery system is considered in which two batteries are connected in series. When a charge state of one of the two batteries becomes low and the discharge current limitation is required, the discharge current limitation is performed on the two batteries. Thereafter, when the battery in a low charge state reaches the discharge termination state, the battery is bypassed, and the discharge current limitation is released. Next, when the charge state of a remaining one battery becomes low and the discharge current limitation is required, the discharge current limitation is performed on the remaining one battery. Thereafter, when the remaining one battery reaches the discharge termination state, the battery is bypassed. For this reason, since the discharge current is limited every time the battery is bypassed, there is a problem that a duration time during which desired power is obtained is shortened without limiting the discharge current.

CITATION LIST

Patent Literature

Patent Literature 1: JP-A-2013-31249

SUMMARY OF INVENTION

The present invention has been made in view of the above circumstances, and an object of the present invention is to provide a battery control unit and a battery system capable of extending a duration time for which desired power is obtained without imposing a discharge current limitation.

A battery control unit and a battery system according to the present invention include: a switching unit configured to be provided for each of a plurality of batteries connected in series to each other, and switch between a connection state in which the corresponding battery is discharged and a non-connection state in which the corresponding battery is not discharged; a discharge current limitation unit configured to limit a discharge current flowing through the battery in the connection state so as not to exceed a minimum discharge current limitation value that is smallest among discharge current limitation values determined according to each battery state; a first control unit configured to switch the battery to the non-connection state in order from the battery having the minimum discharge current limitation value before the discharge current limitation unit limits the discharge current.

Further, a battery system according to the present invention includes a plurality of batteries connected in series to each other; a switching unit configured to be provided for each of the plurality of batteries, and switch between a connection state in which the corresponding battery is discharged and a non-connection state in which the corresponding battery is not discharged; a discharge current limitation unit configured to limit a discharge current flowing through the battery in the connection state so as not to exceed a minimum discharge current limitation value that is smallest among discharge current limitation values determined according to each battery state; and a first control unit configured to switch to the non-connection state in order from the battery having the minimum discharge current limitation value before the discharge current limitation unit limits the discharge current.

DESCRIPTION OF EMBODIMENTS

First Embodiment

A specific embodiment according to the present invention will be described below with reference to the drawings.

First, a first embodiment will be explained. A battery system 1 shown in FIG. 1 is, for example, a device that supplies power obtained by reusing a deteriorated battery.

Figure 1:
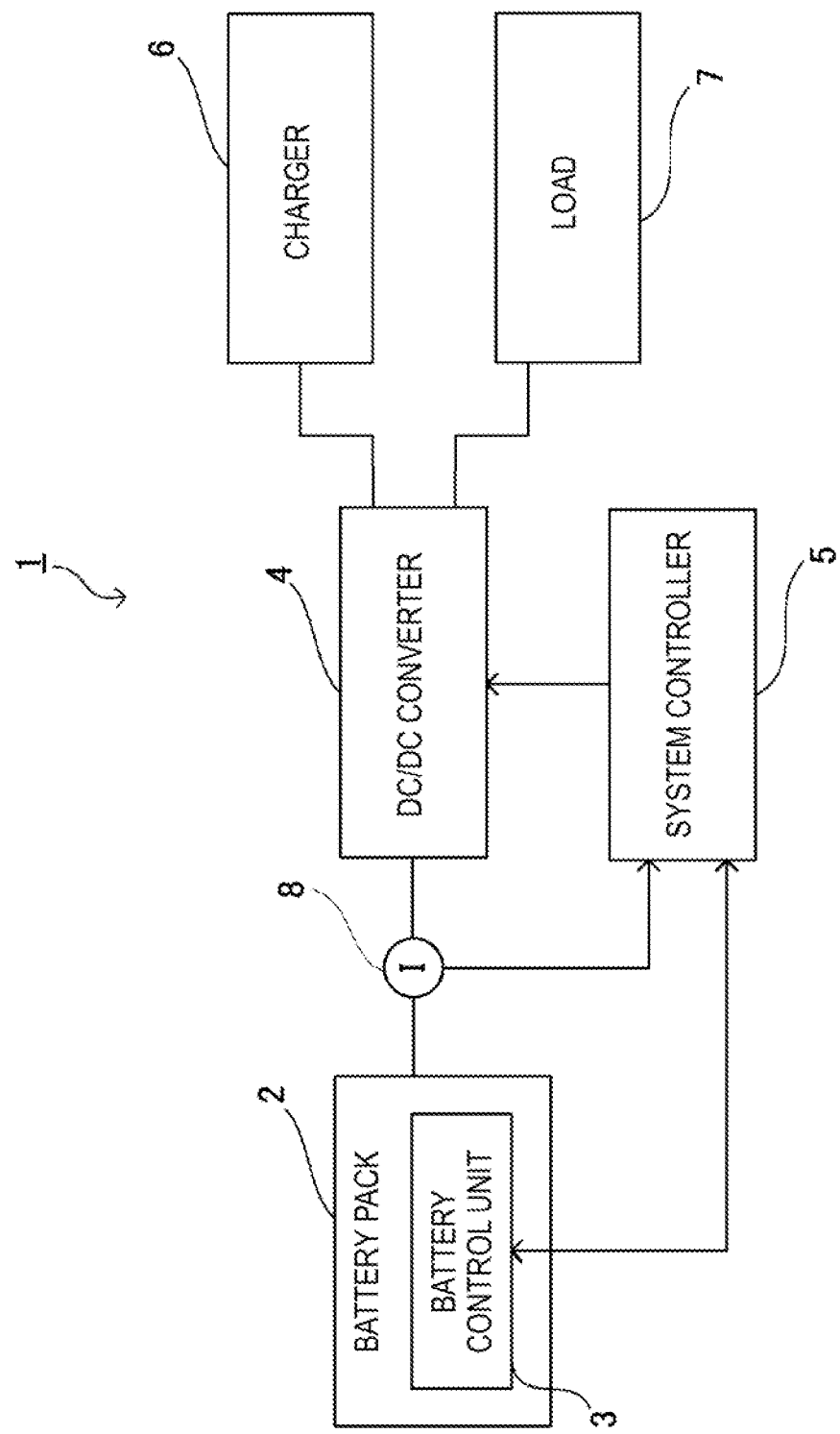
FIG. 1 is a block diagram showing a battery system according to the present invention.

As shown in FIG. 1, the battery system 1 includes a battery pack 2, a battery control unit 3, a power converter 4, a current measurement unit 8, a system controller 5 (discharge current limitation unit), a charger 6, and a load 7. The battery system 1 converts a voltage and a frequency of power from the battery pack 2 via the power converter 4, and then supplies (discharges) the power to the load 7. The battery system 1 converts a voltage and a frequency of power from the charger 6 via the power converter 4, and then supplies the power to the battery pack 2 to charge the battery pack 2.

Figure 2:
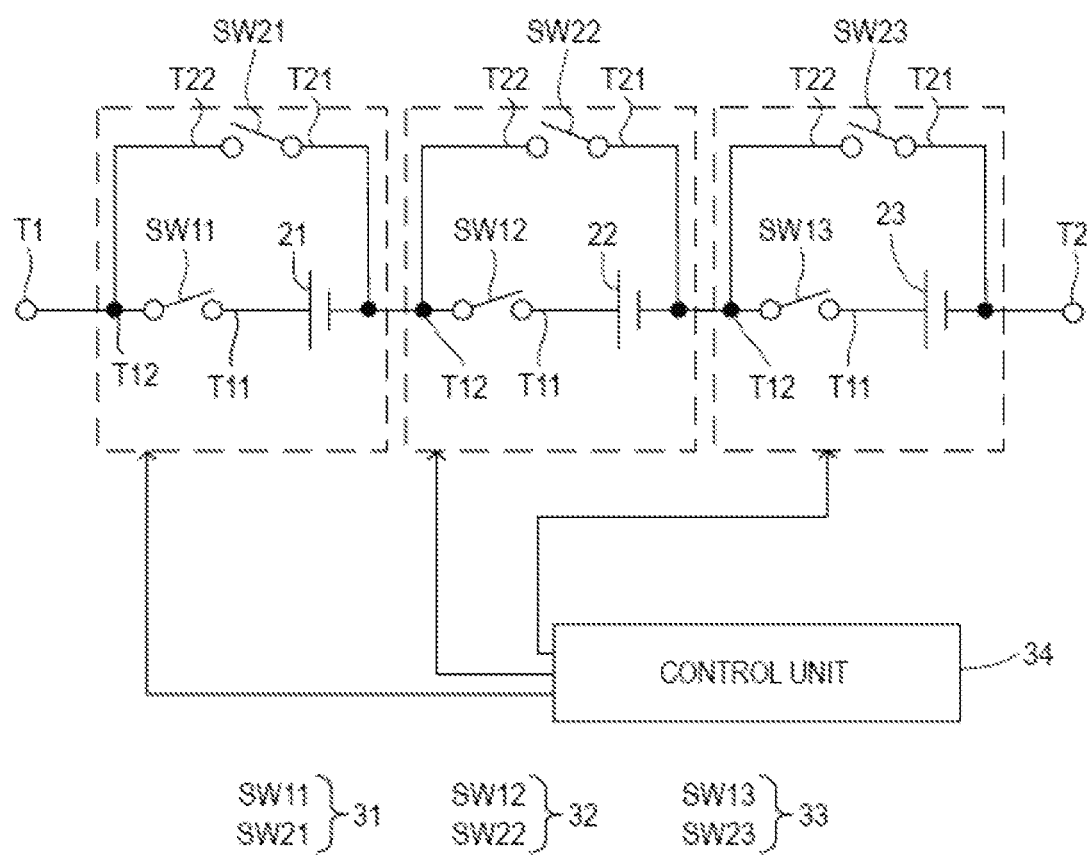
FIG. 2 is a circuit diagram showing details of a battery pack and a battery control unit shown in FIG. 1 according to a first embodiment.

As shown in FIG. 2, the battery pack 2 includes a plurality of batteries 21 to 23. Although an example in which the three batteries 21 to 23 are connected in series will be described in the present embodiment to simplify the description, the present invention is not limited thereto. The number of batteries 21 to 23 may be two, or four or more as long as the number is plural. Each of the plurality of batteries 21 to 23 is a chargeable and dischargeable storage battery, and may be configured by one cell or may be configured by a plurality of cells.

The battery control unit 3 is a unit that switches connection states of the plurality of batteries 21 to 23. The battery control unit 3 includes a plurality of switching units 31 to 33 and a control unit 34 (a first control unit and a second control unit). The plurality of switching units 31 to 33 are provided corresponding to the plurality of batteries 21 to 23, respectively. The plurality of switching units 31 to 33 have the same configuration.

The switching units 31 to 33 switch between a connection state in which the corresponding batteries 21 to 23 can be connected to the charger 6 or the load 7 (can be discharged) and a non-connection state in which the corresponding batteries 21 to 23 cannot be connected to the charger 6 or the load 7 (cannot be discharged). That is, the batteries 21 to 23 in the connection state are electrically connected between a pair of terminals T1 and T2 provided in the battery pack 2, and the batteries 21 to 23 in the non-connection state are disconnected from the pair of terminals T1 and T2. Therefore, when the terminals T1 and T2 of the battery pack 2 are connected to the power converter 4, the batteries 21 to 23 in the connection state can be charged by the charger 6 or can be discharged to the load 7, and the batteries 21 to 23 in the non-connection state cannot be charged by the charger 6 or cannot be discharged to the load 7.

The switching unit 31 includes a first switch SW11 connected in series to the battery 21, and a second switch SW21 connected in parallel to the battery 21 and the first switch SW11. One end T11 of the first switch SW11 is connected to one electrode (for example, a positive electrode) of the battery 21. One end T21 of the second switch SW21 is connected to the other electrode (for example, a negative electrode) of the battery 21, and the other end T22 is connected to the other end T12 of the first switch SW11. The switching units 32 and 33 can be described by replacing "31", "SW11", and "SW21" in the description of the switching unit 31 with "32" and "33", "SW12" and "SW13", and "SW22" and "SW23", respectively, and detailed description thereof will be omitted.

Further, the other end 112 of the first switch SW12 is connected to the negative electrode of the battery 21, and the other end T12 of the first switch SW13 is connected to the negative electrode of the battery 22. That is, the first switches SW12 and SW13 are connected between the batteries 21 and 22 and between the batteries 22 and 23 adjacent to each other, respectively.

According to the above configuration, when the second switches SW21 to SW23 are turned off and the first switches SW11 to SW13 are turned on, the corresponding batteries 21 to 23 are in the connection state. Further, when the first switches SW11 to SW13 are turned off, the corresponding batteries 21 to 23 are in the non-connection state. At this time, when the second switches SW21 to SW23 are turned on, a bypass path is formed, and only the batteries 21 to 23 in the connection state are connected between the terminals T1 and T2.

The control unit 34 includes a well-known CPU, ROM, and RAM, and controls the entire battery control unit 3. The control unit 34 detects a battery state of each of the batteries 21 to 23 based on sensors attached to respective units of the batteries 21 to 23. As the sensor, for example, a voltage sensor that detects a cell voltage (end-to-end voltage) of each of the batteries 21 to 23, a current sensor that detects a current flowing through each of the batteries 21 to 23, a temperature sensor that detects a temperature of each of the batteries 21 to 23, or the like may be considered. Examples of the battery state include the batteries 21 to 23 own condition such as an SOC (charge state) and an SOH (deterioration state) which are obtained based on the cell voltage, the current, and the temperature, and usage status of the battery 21 such as a temperature which is detected by the sensor. Further, the control unit 34 functions as a setting unit and sets a minimum discharge current limitation value based on the battery state of each of the batteries 21 to 23. The control unit 34 transmits the detected battery state of the batteries 21 to 23 and the calculated minimum discharge current limitation value to the system controller 5 to be described later.

Next, calculation of the minimum discharge current limitation value will be described. Lower limit voltage values of the batteries 21 to 23 are set in terms of performance. When the cell voltage of the batteries 21 to 23 falls below the lower limit voltage value, an electrolytic solution is decomposed and a layer of an active material is collapsed, so that the batteries 21 to 23 are greatly damaged. A closed circuit voltage (CCV), which is the cell voltage of the batteries 21 to 23 at the time of discharging, is lower than an open circuit voltage (OCV) by a voltage drop due to the internal resistance. Therefore, even when OCV does not reach the lower limit voltage value, CCV at the time of discharging may reach the lower limit voltage value.

For example, the following examples 1) and 2) will be considered.
1) When OCV=3.5V, CCV=3.0V (when I=1A), and CCV=2.6V (when I=3A)
2) When OCV=3.0V, CCV=2.6V (when I=1A), and CCV=2.0V (when I=3A)

Assuming that the lower limit voltage value of the cell voltage is 2.6V, when 3A is set to the discharge current limitation value in the case of 1), and 1A is set to the discharge current limitation value in the case of 2), it is possible to prevent CCV from falling below the lower limit voltage value of 2.6V.

That is, a discharge current at which CCV of each of the batteries 21 to 23 reaches the lower limit voltage value is the discharge current limitation value of each of the batteries 21 to 23. The smallest one of the discharge current limitation values of the batteries 21 to 23 in the connection state among the batteries 21 to 23 is the minimum discharge current limitation value. That is, the control unit 34 estimates, for each of the batteries 21 to 23, the discharge current at which CCV reaches the lower limit voltage value among the batteries 21 to 23 in the connection state, and sets the smallest one of the estimated discharge currents as the minimum discharge current limitation value.

Next, an example of setting the minimum discharge current limit value will be described. A relation among CCV, OCV, a discharge current I, and an internal resistance R is expressed by the following Equation (1).

$$OCV - R \times I = CCV \quad (1)$$

The control unit 34 may estimate OCV and the internal resistance R based on the battery state (cell voltage, current, temperature, SOC, SOH, and the like) of the batteries 21 to 23 by a known estimation method, and may estimate the discharge current at which CCV reaches the lower limit voltage value by substituting the estimated OCV and the internal resistance R into Equation (1). The estimated discharge current of each of the batteries 21 to 23 is set as the discharge current limitation value, and the smallest value among the discharge current limitation values of the batteries 21 to 23 in the connection state among the batteries 21 to 23 is set as the minimum discharge current value. The control unit 34 may store a table for extracting the discharge current limitation value from the battery state in advance, and may read the discharge current limitation value corresponding to the battery state of the batteries 21 to 23 from the table.

The discharge current limitation value of each of the batteries 21 to 23 described above is set to be increased as OCV (SOC) is increased, and to be decreased as the internal resistance is increased. The control unit 34 periodically detects the battery state of the batteries 21 to 23 that momentarily changes, and sets the discharge current limitation value in accordance with the detected battery state every time the battery state is detected. The control unit 34 controls the switching units 31 to 33.

The power converter 4 is provided between the battery pack 2 and the charger 6 or the load 7. The power converter 4 is, for example, a DC/DC converter. The charger 6 and the load 7 are connected to the battery pack 2 via the power converter 4.

The current measurement unit 8 measures a current flowing from the battery pack 2 to the power converter 4, and outputs the measured current to the system controller 5.

The system controller 5 includes a well-known CPU, ROM, and RAM, determines a discharge output of the load 7 based on an operation command of the load 7, the battery state of the batteries 21 to 23 received from the battery control unit 3, and the minimum discharge current limitation value, and performs output control of the power converter 4. The system controller 5 obtains a discharge current consumed by the load 7 in accordance with an operation of the load 7 or the like. When the minimum discharge current limitation value falls below the discharge current consumed by the load 7, the system controller 5 outputs a control value of the minimum discharge current limitation value to the power converter 4. The power converter 4 reduces an output current and a voltage to the load 7 based on the control value of the minimum discharge current limitation value from the system controller 5, thereby making it possible to make the current output from the battery pack 2 within the minimum current limitation value. When the minimum discharge current limitation value falls below the determined discharge current consumed by the load 7 or is expected to fall below the determined discharge current consumed by the load 7, the system controller 5 transmits a limit signal indicating the fact to the battery control unit 3 before limiting the discharge current.

Figure 3:
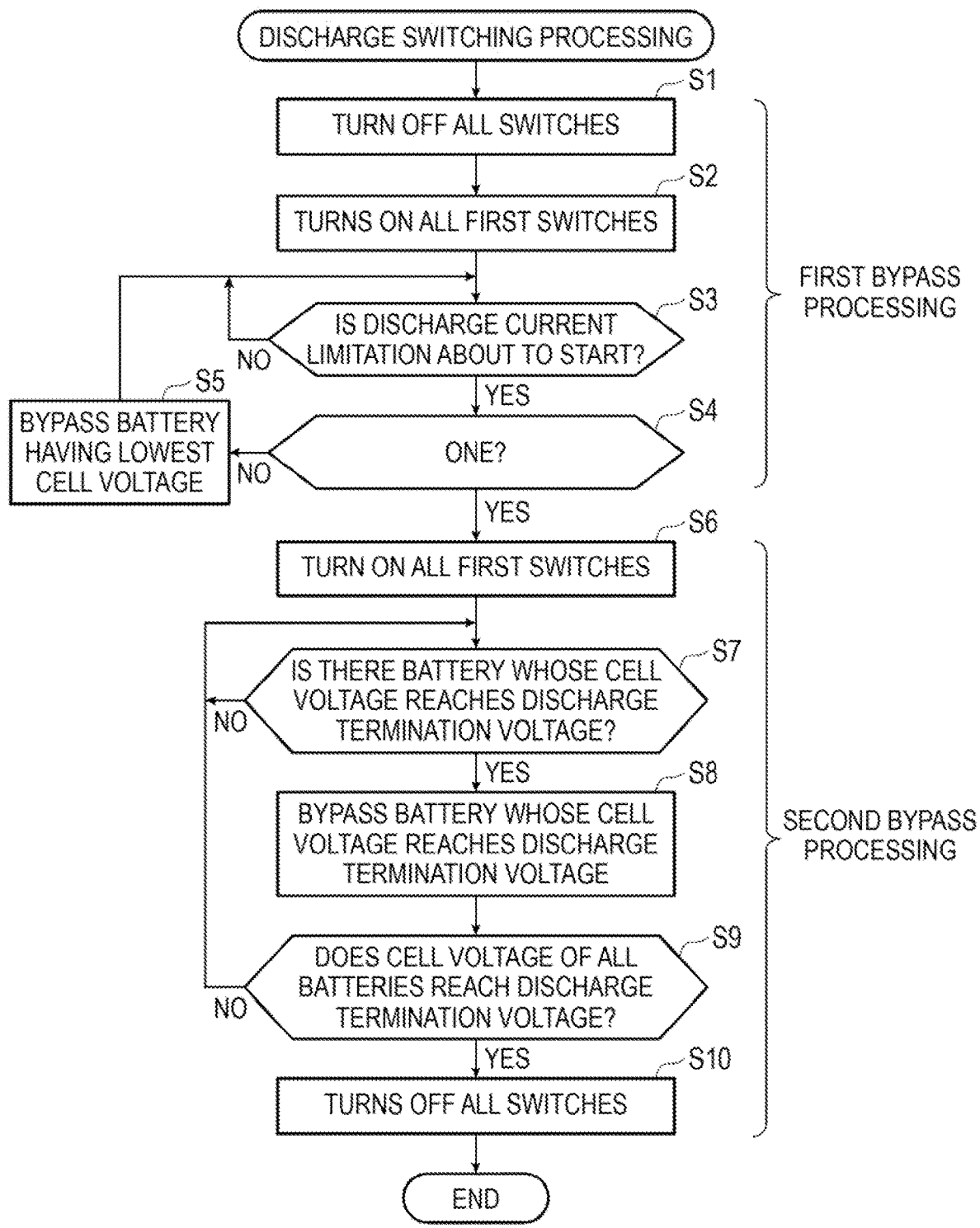
FIG. 3 is a flowchart showing a discharge switching processing procedure of a control unit constituting the battery control unit shown in FIG. 1 according to the first embodiment.
Figure 4:
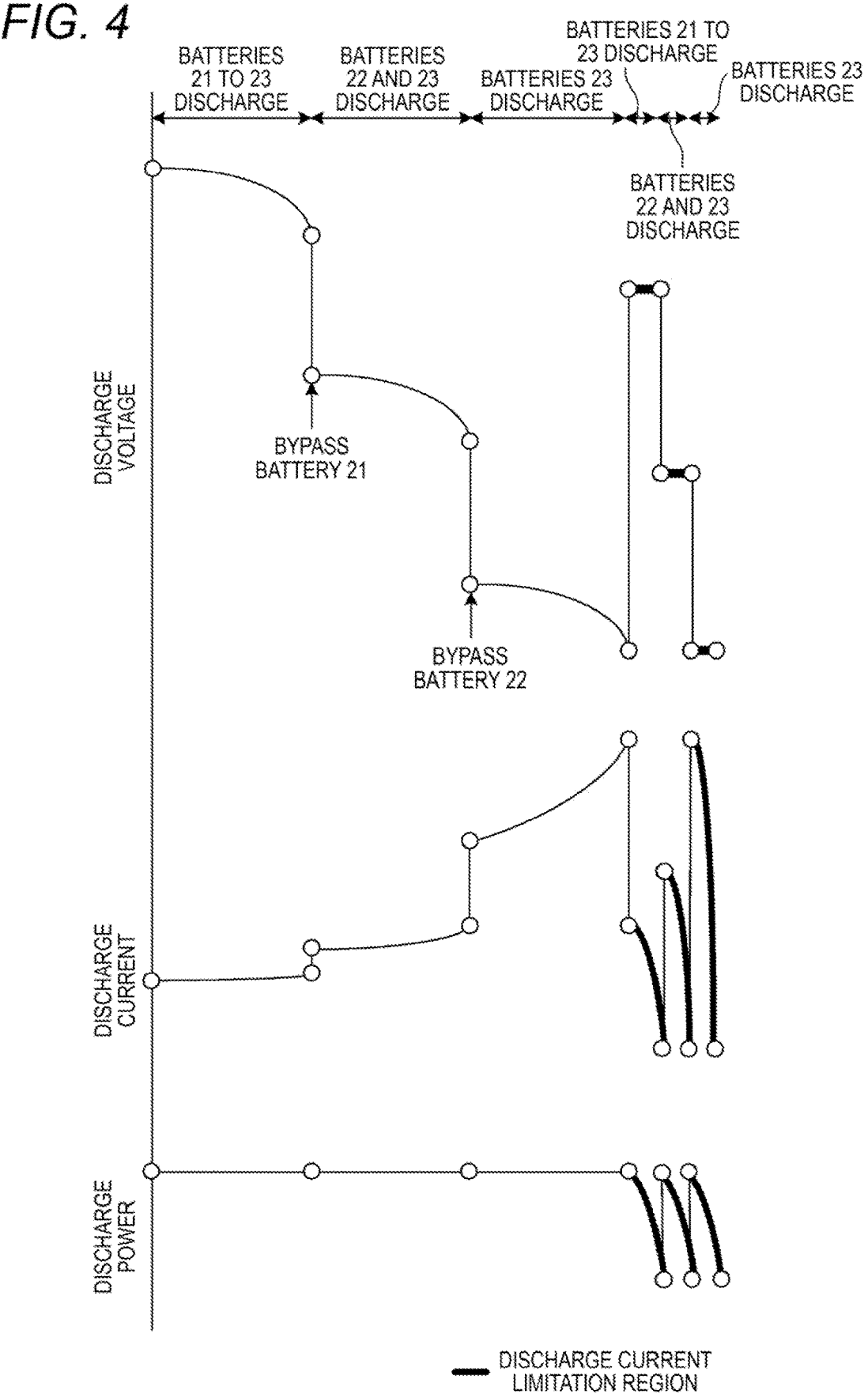
FIG. 4 is a time chart of a discharge voltage, a discharge current, and discharge power of a battery when a maximum discharge power is continuously supplied to a load in the battery system shown in FIG. 1.

Next, an operation of the battery system 1 will be described with reference to FIGS. 3 and 4. FIG. 3 is a flowchart showing a discharge switching processing procedure of the control unit 34 constituting the battery control unit 3 shown in FIG. 1. FIG. 4 is a time chart of the discharge voltage, the discharge current, and the discharge power of the batteries 21 to 23 when the maximum discharge power is continuously supplied to the load 7 in the battery system 1 shown in FIG. 1.

The control unit 34 periodically transmits the battery state of the batteries 21 to 23 and the minimum discharge current limitation value to the system controller 5 when receiving a discharge mode instruction. In parallel with this, the control unit 34 executes discharge switching processing shown in FIG. 3 when receiving the discharge mode instruction.

First, the control unit 34 turns off all the first switches SW11 to SW13 and all the second switches SW21 to SW23 (step S1). Thereafter, the control unit 34 turns on all the first switches SW11 to SW13 (step S2). As a result, the batteries 21 to 23 are in the connection state, and the batteries 21 to 23 are in the dischargeable state. For the sake of simplicity, it is assumed that the cell voltage is decreased in order of battery 21<battery 22<battery 23.

At this time, the minimum discharge current limitation value is set to, for example, a value corresponding to the battery 21 having the lowest cell voltage. When the cell voltage of the battery 21 is decreased as the discharge progresses, the minimum discharge current limitation value is also decreased. When the minimum discharge current limitation value falls below the discharge current consumed by the load 7, or is expected to fall below the discharge current consumed by the load 7, the system controller 5 transmits a limit signal to the battery control unit 3. The control unit 34 determines that the discharge current limitation is about to start when receiving the limit signal (Y in step S3), and determines whether there is one battery 21 to 23 in the connection state (step S4). When all the batteries 21 to 23 are in the connection state, the control unit 34 determines that the number of the batteries 21 to 23 in the connection state is not one (N in step S4), switches the battery 21 having the lowest cell voltage to the non-connection state and bypasses the battery 21 (step S5), and then returns to step S3.

As a result, the batteries 22 and 23 are in the connection state, and the battery 21 is in the non-connection state. Therefore, the minimum discharge current limitation value is set to a value corresponding to, for example, the battery 22 having the lowest cell voltage among the batteries 22 and 23 in the connection state. Since the cell voltage of the battery 22 is higher than that of the battery 21, the minimum discharge current limitation value is reset to a large value by bypassing the battery 21. Therefore, the system controller 5 determines that it is not necessary to limit the discharge current, and the discharge current is not limited.

Therefore, when the cell voltage of the battery 22 is decreased as the discharge progresses, the minimum discharge current limitation value is also decreased. When the minimum discharge current limitation value falls below the discharge current consumed by the load 7, or is expected to fall below the discharge current consumed by the load 7, the system controller 5 transmits a limit signal to the battery control unit 3. When determining that the discharge current limitation is about to start when receiving the limit signal (Y in step S3), the control unit 34 determines whether there is one battery 21 to 23 in the connection state (step S4). When the batteries 22 and 23 are in the connection state, the control unit 34 determines that the number of the batteries 21 to 23 in the connection state is not one (N in step S4), switches the battery 22 having the lowest cell voltage to the non-connection state and bypasses the battery 22 (step S5), and then returns to step S3.

As a result, the battery 23 is in the connection state, and the batteries 21 and 22 are in the non-connection state. Therefore, the minimum discharge current limitation value is set to a value corresponding to the battery 23 in the connection state. For example, since the cell voltage of the battery 23 is higher than that of the battery 22, the minimum discharge current limitation value is reset to a large value by bypassing the battery 22. Therefore, the system controller 5 determines that it is not necessary to limit the discharge current, and the discharge current is not limited.

Therefore, when the cell voltage of the battery 23 is decreased as the discharge progresses, the minimum discharge current limitation value is also decreased. When the minimum discharge current limitation value falls below the discharge current consumed by the load 7, or is expected to fall below the discharge current consumed by the load 7, the system controller 5 transmits the limit signal to the battery control unit 3. When determining that the discharge current limitation is about to start when receiving the limit signal (Y in step S3), the control unit 34 determines whether there is one battery 21 to 23 in the connection state (step S4). When the battery 23 is in the connection state, the control unit 34 determines that the number of the batteries 21 to 23 in the connection state is one (Y in step S4), and turns on all the first switches SW11 to SW13 (step S6).

Thereafter, the control unit 34 updates the minimum discharge current limitation value according to the discharge current limitation value of each battery 23, and bypasses the batteries 21 to 23 in order from the battery 21 to 23 whose cell voltage reaches the discharge termination voltage (Y in step S7, S8). Then, when all the batteries 21 to 23 reach the discharge termination voltage and are bypassed (Y in step S9), the control unit 34 turns off all the first switches SW11 to SW13 and the second switches SW21 to SW23 (step S10), and ends the process.

According to the embodiment described above, the control unit 34 switches the battery 21 to 23 to the non-connection state in order from the battery 21 to 23 having the minimum discharge current limit value before the system controller 5 limits the discharge current. As described above, when the batteries 21 to 23 are bypassed, the minimum discharge current limitation value is reset to a large value, and it is possible to prevent the system controller 5 from limiting the discharge current. Thus, as shown in FIG. 4, during first bypass processing (steps S1 to S5 in FIG. 3) in which the battery 21 to 23 is bypassed before the discharge current limitation is performed, the discharge current limitation is not imposed. Limitation of the discharge current is performed every time the battery 21 to 23 is bypassed during second bypass processing (steps S6 to S10 in FIG. 3) in which the battery 21 to 23 is bypassed each time the discharge is terminated after the first bypass processing. Therefore, it is possible to extend a duration time for which desired power can be obtained without imposing the discharge current limitation.

According to the embodiment described above, the control unit 34 bypasses the battery 21 to 23 each time immediately before the discharge current limitation is performed, and the number of the batteries 21 to 23 in the connection state is one, and thereafter, before all the batteries 21 to 23 are in the non-connection state, the control unit 34 switches all the batteries 21 to 23 to the connection state, and switches the battery 21 to 23 to the non-connection state in order from the battery 21 to 23 determined to have reached the discharge termination voltage. As a result, the batteries 21 to 23 can be used until the discharge termination voltage is reached.

According to the embodiment described above, the system controller 5 determines that the minimum discharge current limit value falls below the discharge current consumed by the load 7 or is expected to fall below the discharge current consumed by the load 7, and before limiting the discharge current, the control unit 34 switches the battery 21 to 23 having the minimum discharge current limitation value to the non-connection state. As a result, it is possible to switch the batteries 21 to 23 to the non-connection state immediately before the discharge current limitation is imposed, and it is possible to further extend the duration time for which desired power can be obtained.

According to the first embodiment described above, the control unit 34 performs the second bypass processing after performing the first bypass processing, but the present invention is not limited thereto. The control unit 34 may perform only the first bypass processing. The second bypass processing may be performed only in an event of a disaster or in an emergency such as power supply to an air conditioner of an automobile to protect human life.

Second Embodiment

Figure 5:
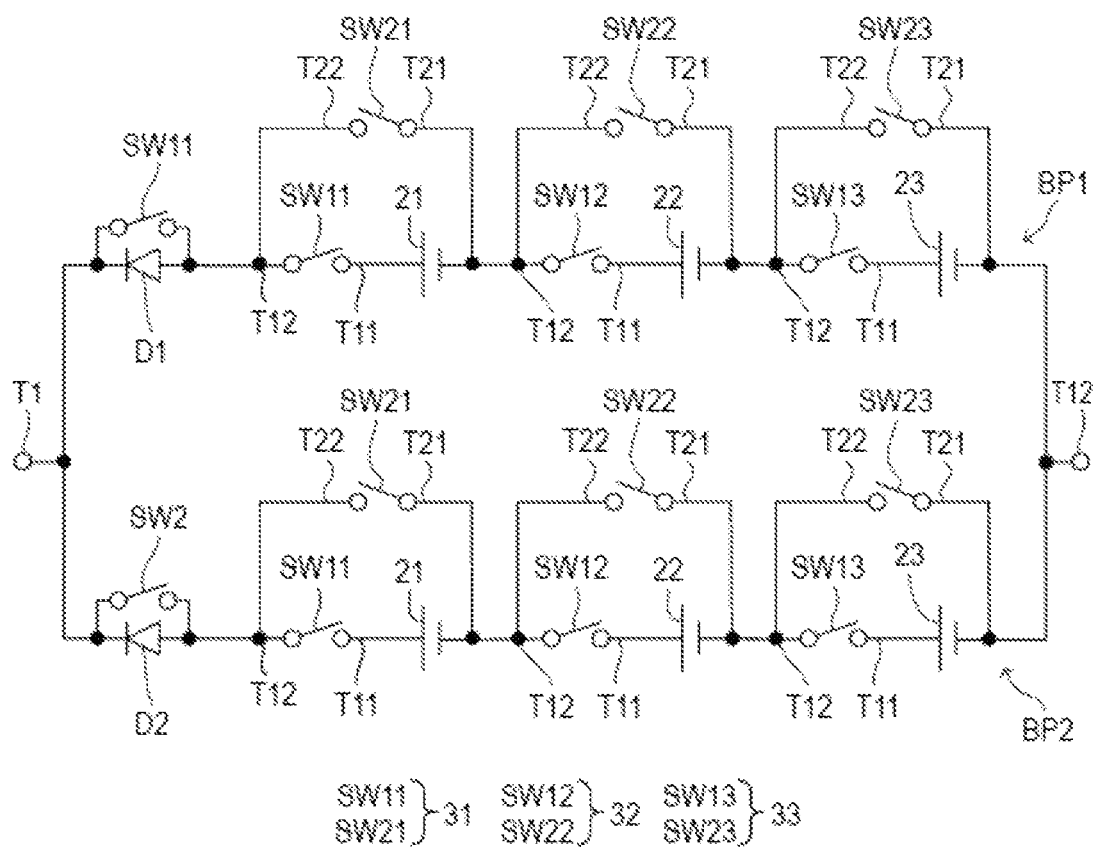
FIG. 5 is a circuit diagram showing details of the battery pack and the battery control unit shown in FIG. 1 according to a second embodiment to a fourth embodiment.

Next, a second embodiment of the present invention will be described with reference to FIG. 5. In FIG. 5, the same reference numerals are given to the same portions as those of the battery control unit 3 shown in FIG. 2 which has already been described in the first embodiment, and the detailed description thereof will be omitted. A major difference between the first embodiment and the second embodiment is a configuration of the battery pack 2. In the second embodiment, the battery pack 2 includes a first assembled battery BP1 and a second assembled battery BP2 connected in parallel to each other. Each of the first assembled battery BP1 and the second assembled battery BP2 includes the batteries 21 to 23.

In the present embodiment, in order to simplify the description, the battery pack 2 including assembled batteries of two systems of the first assembled battery BP1 and the second assembled battery BP2 will be described, but the present invention is not limited thereto. The battery pack 2 only needs to include at least two systems of the first assembled battery BP1 and the second assembled battery BP2, and may include three or more systems of assembled batteries.

A major difference between the first embodiment and the second embodiment is that the battery control unit 3 includes a first diode D1, a second diode D2, a first bypass switch SW1, and a second bypass switch SW2. The first diode D1 is connected in series to the first assembled battery BP1 such that a battery discharge direction is a forward direction. The first bypass switch SW1 is connected in series to the battery 21 and is connected in parallel to the first diode D1. The second diode D2 is connected in series to the second assembled battery BP2 such that the battery discharge direction is the forward direction. The second bypass switch SW2 is connected in series to the second assembled battery BP2 and is connected in parallel to the second diode D2.

According to the configuration described above, when the first and second bypass switches SW1 and SW2 are turned off, the first and second assembled batteries BP1 and BP2 are connected to a terminal T1 via the first and second diodes D1 and D2. Thus, a circulating current flowing from the first assembled battery BP1 to the second assembled battery BP2 or from the second assembled battery BP2 to the first assembled battery BP1 can be cut off. When the first and second bypass switches SW1 and SW2 are turned on, the first and second diodes D1 and D2 are bypassed. Since other configurations are the same as those of the first embodiment, detailed description thereof will be omitted here.

Next, an operation of the battery system 1 will be described. When receiving a discharge mode instruction, the control unit 34 periodically transmits a charge state and a minimum discharge current limitation value of the batteries 21 to 23 of the first assembled battery BP1 and the batteries 21 to 23 of the second assembled battery BP2 to the system controller 5 as in the first embodiment. In parallel with this, the control unit 34 executes discharge switching processing of the first and second assembled batteries BP1 and BP2 shown in FIG. 6 when receiving the discharge mode instruction. First, the control unit 34 turns off all the first switches SW11 to SW13, all the second switches SW21 to SW23, and the first and second bypass switches SW1 and SW2 (step S11). Thereafter, the control unit 34 turns on all the first switches SW11 to SW13 (step S12). As a result, the batteries 21 to 23 of the first and second assembled batteries BP1 and BP2 are in a connection state.

Thereafter, the control unit 34 detects CCV of the batteries 21 to 23 of the first and second assembled batteries BP1 and BP2, and determines whether there is battery 21 to 23 whose CCV falls below a first predetermined value (for example, 2.5V) (step S13). The predetermined voltage is set to a value higher than the lower limit voltage value (for example, 2.4V) of CCV. When there is no battery 21 to 23 whose CCV falls below the first predetermined value (N in step S13), the control unit 34 immediately returns to step S13.

On the other hand, when there is battery 21 to 23 whose CCV falls below the first predetermined value (Y in step S13), the control unit 34 determines whether there is one battery 21 to 23 of the first and second assembled batteries BP1 and BP2 in the connection state (step S14). When it is determined that the number of batteries 21 to 23 in the connection state is not one among the batteries 21 to 23 of the first and second assembled batteries BP1 and BP2 (N in step S14), the control unit 34 switches the battery 21 to 23 whose CCV falls below the first predetermined value to a non-connection state and bypasses the battery 21 to 23 whose CCV falls below the first predetermined value (step S15), and then returns to step S13.

On the other hand, when it is determined that the number of the batteries 21 to 23 of the first and second assembled batteries BP1 and BP2 in the connection state is one (Y in step S14), the control unit 34 turns on all the first switches SW11 to SW13 (step S16). In discharge of the plurality of systems of assembled batteries (first and second assembled batteries BP1 and BP2) connected in parallel, when a system having a high total voltage is discharged, and total voltages of the respective systems become equal, the batteries are simultaneously discharged from all the systems. The total voltage is a total value of end-to-end voltages (end-to-end voltage at the time of discharging is CCV) of the battery in the connection state among the batteries 21 to 23 constituting each system. As described above, the control unit 34 bypasses the battery 21 to 23 whose CCV falls below the first predetermined value. Therefore, at a time when second bypass processing is started (FIG. 6), a total CCV (=total voltage) of the batteries 21 to 23 constituting the first assembled battery BP1 is equal to a total CCV of the batteries 21 to 23 constituting the second assembled battery BP2. In step S16, when the control unit 34 brings the batteries 21 to 23 of the first and second assembled batteries BP1 and BP2 into the connection state, the discharge current can be output from both of the first and second assembled batteries BP1 and BP2.

Thereafter, the control unit 34 updates the minimum discharge current limitation value according to the discharge current limitation value of each battery, and bypasses the battery 21 to 23 in order from the battery 21 to 23 whose CCV reaches the discharge termination voltage (Y in step S17, S18). Then, when all the batteries 21 to 23 reach the discharge termination voltage and are bypassed (Y in step S19), the control unit 34 turns off all the first switches SW11 to SW13 and the second switches SW21 to SW23 (step S20), and ends the process.

According to the embodiment described above, the control unit 34 switches the battery 21 to 23 to the non-connection state each time the battery 21 to 23 falls below the first predetermined value larger than the lower limit voltage value. As a result, the control unit 34 can switch the battery 21 to 23 to the non-connection state in order from the battery 21 to 23 having the minimum discharge current limitation value before the system controller 5 limits the discharge current.

Figure 6:
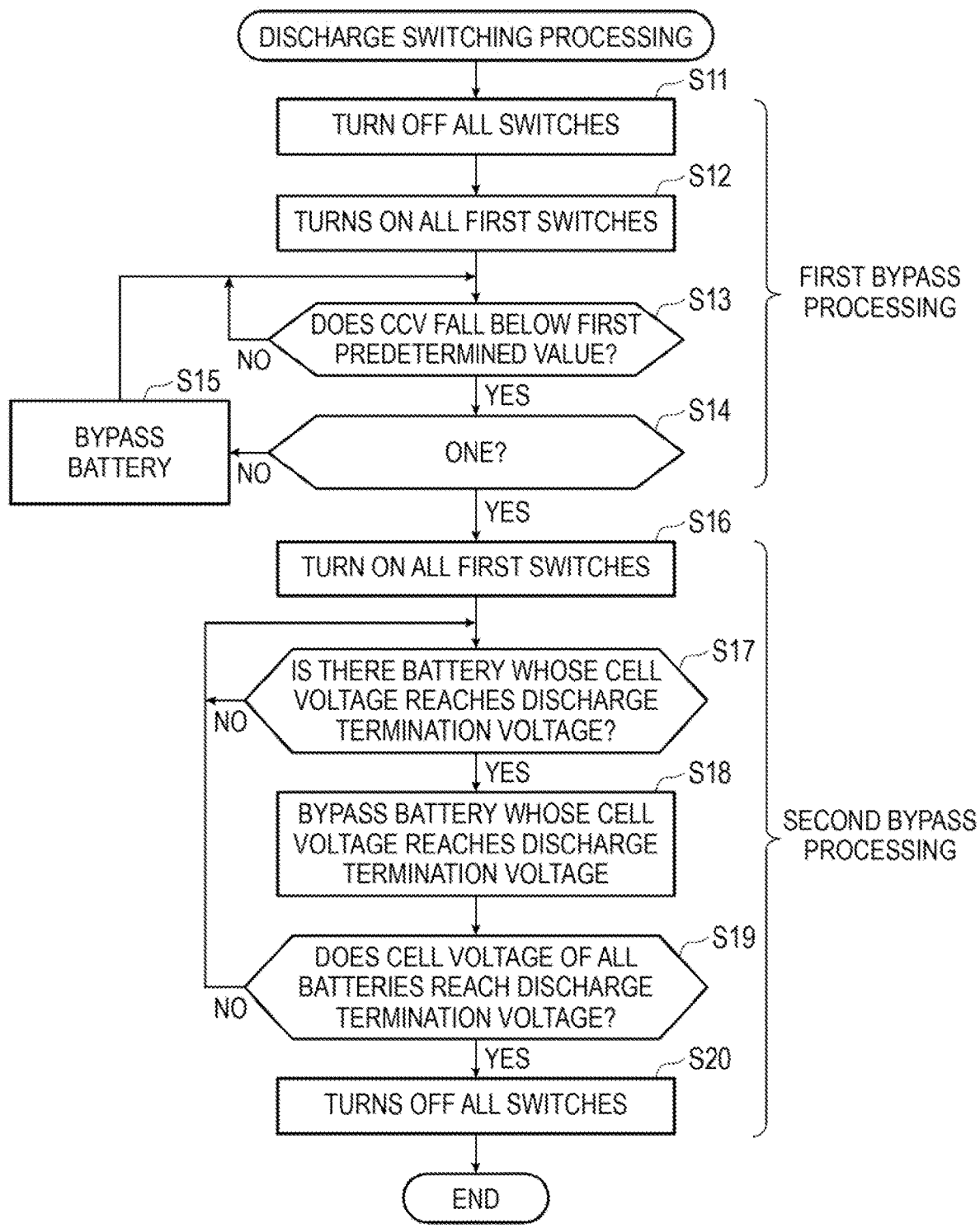
FIG. 6 is a flowchart showing a discharge switching processing procedure of a control unit constituting the battery control unit shown in FIG. 1 according to the second embodiment.

According to the embodiment described above, the control unit 34 bypasses the battery 21 to 23 based on CCV of the battery 21 to 23 in the first bypass processing (steps S11 to S15 in FIG. 6). As a result, all the batteries 21 to 23 are in the connection state after making the total CCV of the batteries 21 to 23 constituting the first assembled battery BP1 equal to the total CCV of the batteries 21 to 23 constituting the second assembled battery BP2. When all the batteries 21 to 23 are in the connection state, it is possible to increase the possibility that the discharge current can be obtained from both the first assembled battery BP1 and the second assembled battery BP2. Therefore, a large amount of discharge current can be supplied to the load 7 even during the second bypass processing in which the discharge current is limited.

According to the second embodiment described above, the first predetermined value is always set to the same value, and the total CCV of the batteries 21 to 23 constituting the first assembled battery BP1 is equal to the total CCV of the batteries 21 to 23 constituting the second assembled battery BP2 at the time of step S16, but the present invention is not limited thereto. At the time of step S16, it is sufficient that the total CCV of the batteries 21 to 23 constituting the first assembled battery BP1 and the total CCV of the batteries 21 to 23 constituting the second assembled battery BP2 may be equal to each other. For example, the first predetermined value may be changed each time the batteries 21 to 23 of the same system are switched to the non-connection state.

Third Embodiment

Next, a third embodiment of the present invention will be described. Since a configuration of the battery system 1 of the third embodiment is the same as that of the second embodiment, a detailed description thereof will be omitted here.

Figure 7:
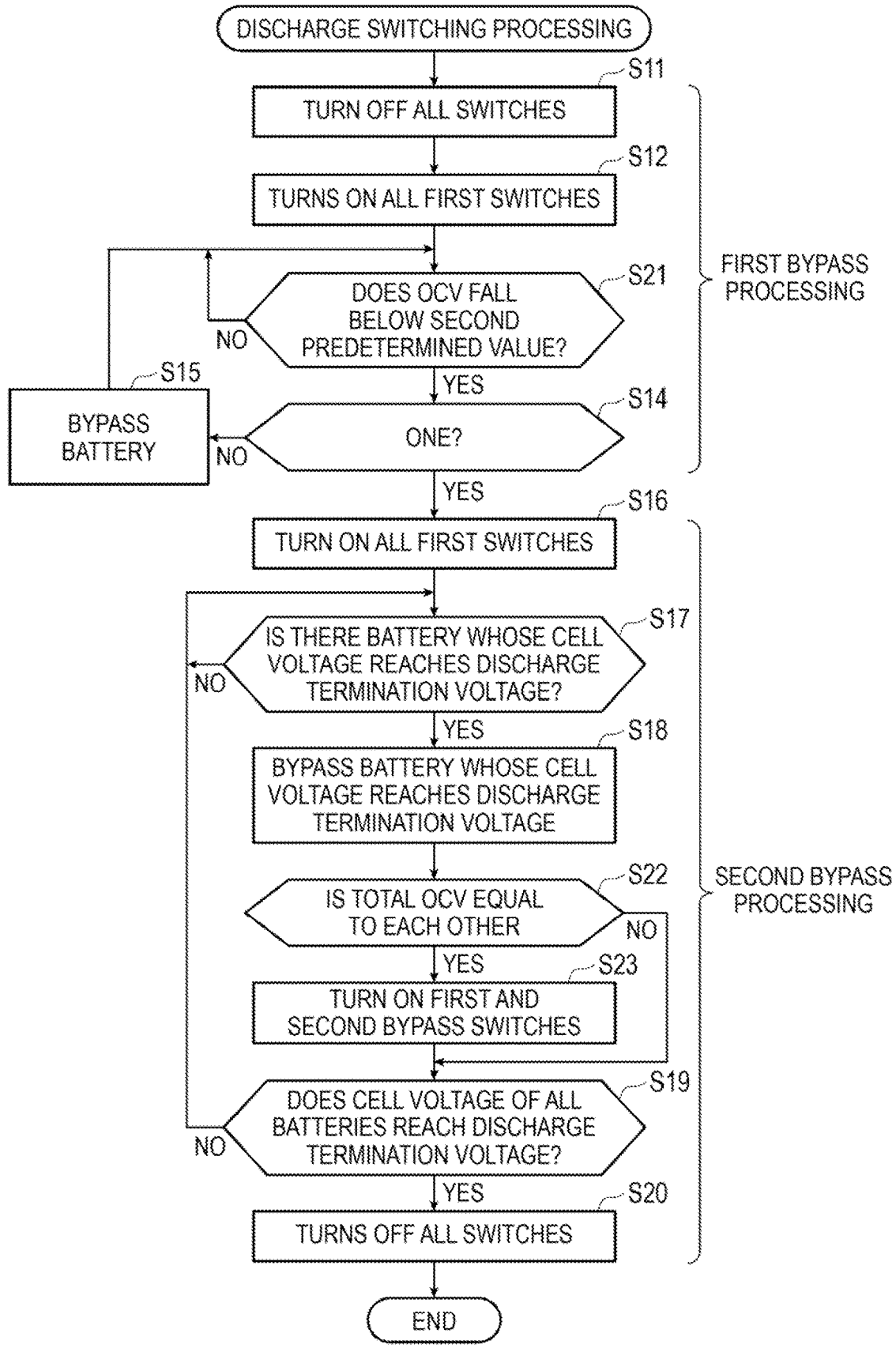
FIG. 7 is a flowchart showing a discharge switching processing procedure of a control unit constituting the battery control unit shown in FIG. 1 according to the third embodiment.

Next, an operation of the third embodiment will be described with reference to FIG. 7. In FIG. 7, the same reference numerals are given to the same portions as those of steps shown in FIG. 6 which has already been described in the second embodiment, and the detailed description thereof will be omitted.

A major difference between the second embodiment and the third embodiment is that step S21 is performed instead of step S13. In the second embodiment described above, in first bypass processing, the control unit 34 switches the battery 21 to 23 to a non-connection state in order based on CCV of the batteries 21 to 23. CCV varies according to the internal resistance R and a discharge current I of the batteries 21 to 23, as shown in the above Equation (1). For this reason, even when the batteries 21 to 23 of all systems are in a connection state after the first bypass processing, total voltages of all the systems cannot be equalized, and there is a possibility that discharging cannot be performed at the same time.

Therefore, in the third embodiment, when OCV (charge state) of the battery 21 to 23 falls below a second predetermined value, the control unit 34 switches the battery 21 to 23 to the non-connection state in order (step S21). OCV can be estimated based on the battery state of the batteries 21 to 23 as described above. At this time, after an end of the first bypass processing, the control unit 34 sets the second predetermined value for each of the first and second assembled batteries BP1 and BP2 so that a total OCV (total charge state) of the first assembled battery BP1 and the second assembled battery BP2 becomes higher as a total internal resistance of the first assembled battery BP1 and the second assembled battery BP2 becomes higher.

Figure 8:
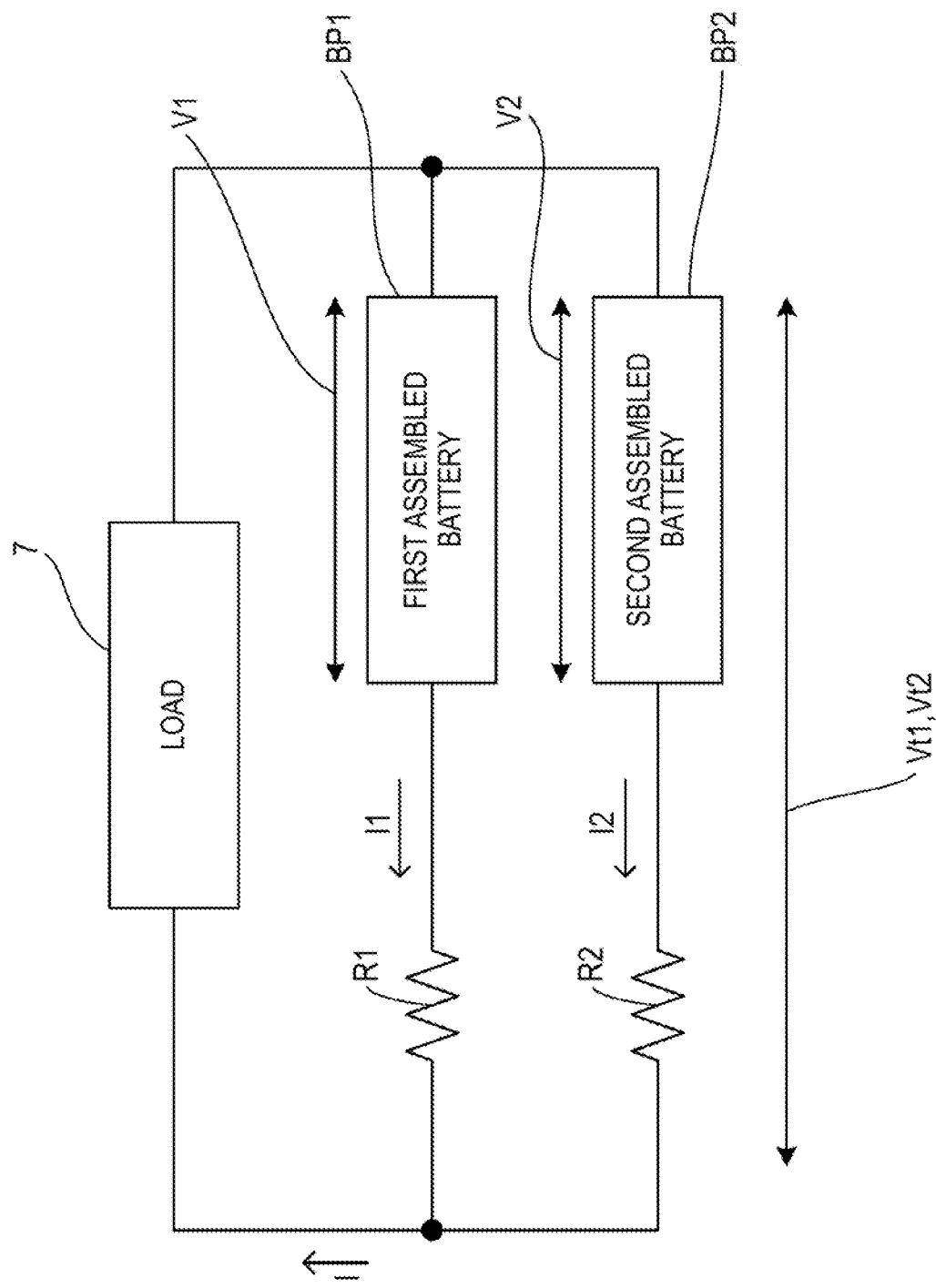
FIG. 8 is an explanatory diagram for illustrating a method of setting a second predetermined value.

An example of a method of setting the second predetermined value will be described with reference to FIG. 8. When the same discharge current flows from the first and second assembled batteries BP1 and BP2, discharge currents I1 and I2 of the first and second assembled batteries BP1 and BP2 are expressed by the following Equation (2). It is noted that I indicates a current flowing through the load 7.

$$I1 = I2 = \tfrac{1}{2} \cdot I \tag{2}$$

Total voltages Vt1 and Vt2 of the first and second assembled batteries BP1 and BP2 can be expressed by the following Equations (3) and (4). It is noted that V1 indicates a total OCV (total value of OCV) of the batteries 21 to 23 constituting the first assembled battery BP1, V2 indicates a total OCV of the batteries 21 to 23 constituting the second assembled battery BP2, R1 indicates a total internal resistance of the batteries 21 to 23 constituting the first assembled battery BP1, and R2 indicates a total internal resistance of the batteries 21 to 23 constituting the second assembled battery BP2.

$$Vt1 = V1 - R1 \times I1 \tag{3}$$

$$Vt2 = V2 - R2 \times I2 \tag{4}$$

In order to cause the same discharge current to flow from the first and second assembled batteries BP1 and BP2, the total voltage Vt1 of the first assembled battery BP1 and the total voltage Vt2 of the second assembled battery BP2 need to be equal, and a relation can be expressed by the following Equation (5).

$$V1 - R1 \times I1 = V2 - R2 \times I2 \tag{5}$$

When V2−V1 is obtained from Equation (5), the following Equation (6) is obtained.

$$V2 - V1 = \tfrac{1}{2} \cdot (R2 - R1) \cdot I \tag{6}$$

Assuming that R1=0.2Ω, R2=0.1Ω, and the discharge current I flowing through the load 7 is 2A, the same discharge current can flow from the first and second assembled batteries BP1 and BP2 when V1 is higher than V2 by 0.1V. Therefore, the control unit 34 first estimates the total internal resistances R1 and R2 based on the battery state of the batteries 21 to 23 by a known method. Thereafter, the control unit 34 obtains the discharge current I flowing through the load 7 at a start of the second bypass processing. In the present embodiment, the control unit 34 obtains, as the discharge current I, a minimum discharge current limit value at the start of the second bypass processing. The control unit 34 substitutes the estimated total internal resistances R1 and R2 and the obtained discharge current I into Equation (6) to obtain a total OCV difference (V2−V1). Then, the control unit 34 sets the second predetermined value for each of the first and second assembled batteries BP1 and BP2 so as to be the total OCV difference (V2−V1) obtained at the start of the second bypass processing.

For example, when the total OCV difference is 0.1V, the total OCV of the first assembled battery BP1 is set to 8.7V and the total OCV of the second assembled battery BP2 is set to 8.8V at the start of the second bypass processing. Therefore, the control unit 34 sets the second predetermined value to 8.7/3V for the first assembled battery BP1, and sets the second predetermined value to 8.8/3V for the second assembled battery BP2. As a result, the batteries 21 to 23 constituting the first assembled battery BP1 are bypassed each time OCV falls below 8.7/3V, and the batteries 21 to 23 constituting the second assembled battery BP2 are bypassed each time OCV falls below 8.8/3V.

A major difference between the second embodiment and the third embodiment is that steps S22 and S23 are performed in the second bypass processing (FIG. 7). In the second bypass processing, the discharge current is limited by the system controller 5. Therefore, the discharge current becomes small, and a voltage drop due to the internal resistance becomes small. The total OCV of the first and second assembled batteries BP1 and BP2 is determined by conditions of the discharge current I flowing through the load 7 obtained as described above. When the discharge current I actually flowing through the load 7 deviates from the obtained discharge current I, the total OCV is finally equal by repeating the discharge from a side having the higher total voltage. Therefore, when the control unit 34 determines that the total OCV of the first assembled battery BP1 and the total OCV of the second assembled battery BP2 are equal to each other (Y in step S22), the control unit 34 functions as a third control unit, turns on the first and second bypass switches SW1 and SW2 (step S23), and bypasses the first and second diodes D1 and D2.

According to the third embodiment described above, the control unit 34 switches the battery 21 to 23 to the non-connection state based on OCV of the batteries 21 to 23, increases the total OCV of the first assembled battery BP1 and the second assembled battery BP2 as the internal resistance of the first assembled battery BP1 and the second assembled battery BP2 is increased, and then switches all batteries 21 to 23 to the connection state. As a result, the possibility that the discharge current can be taken out from both the first assembled battery BP1 and the second assembled battery BP2 during the second bypass processing can be further increased.

According to the third embodiment described above, when the total OCV of the first assembled battery BP1 and the second assembled battery BP2 becomes equal during the second bypass processing, the first bypass switch SW1 and the second bypass switch SW2 are turned on. As a result, the first and second diodes D1 and D2 are bypassed, and loss in the first and second diodes D1 and D2 can be reduced.

According to the third embodiment described above, OCV and the total OCV are used as the charge state and a total charge state, but the present invention is not limited thereto. The charge state is one of parameters indicating capacities of the batteries 21 to 23, and may be a voltage corresponding to SOC in addition to OCV. The total charge state is a sum of the charge states of the batteries 21 to 23 in the connection state in the first assembled battery BP1 and the second assembled battery BP2, and may be a voltage according to the total SOC in addition to the total OCV.

According to the first to third embodiments described above, the control unit 34 switches the connection state based on OCV, but the present invention is not limited thereto. It is sufficient to switch based on the charge state of the batteries 21 to 23, and the control unit 34 may switch the connection state based on SOC and the discharge current limitation value.

The first and second bypass switches SW1 and SW2 described in the second and third embodiments may be mechanical switches or semiconductor switches. The first and second diodes D1 and D2 and the first and second bypass switches SW1 and SW2 may be integrated into a semiconductor circuit.

The present invention is not limited to the above embodiment, and modifications, improvements, and the like can be made as appropriate. In addition, materials, shapes, dimensions, numbers, arrangement positions or the like of elements in the embodiment described above are optional and not limited as long as the present invention can be achieved. According to the embodiment described above, the system controller 5 separate from the battery control unit 3 limits the discharge current, but the invention is not limited thereto. The battery control unit 3 may control the load 7 and limit the discharge current.

Here, characteristics of the embodiment of the battery control unit and the battery system according to the present invention described above will be briefly summarized in the following [1] to [8].

[1] A battery control unit (3), including:
  a switching unit (31 to 33) configured to be provided for each of a plurality of batteries (21 to 23) connected in series to each other and switch between a connection state in which the corresponding battery (21 to 23) is discharged and a non-connection state in which the corresponding battery (21 to 23) is not be discharged;
  a discharge current limitation unit (5) configured to limit a discharge current flowing through the battery (21 to 23) in the connection state so as not to exceed a minimum discharge current limitation values among discharge current limitation values determined according to each battery state; and
  a first control unit (34) configured to switch the battery (21 to 23) to the non-connection state in order from the battery (21 to 23) having the minimum discharge current limitation value before the discharge current limitation unit (5) limits the discharge current.

[2] The battery control unit (3) according to [1], further including:
  a setting unit (34) configured to estimate a battery state and an internal resistance of each of the plurality of batteries (21 to 23) in the connection state, obtain a discharge current limitation value for each of the plurality of batteries (21 to 23) based on the estimated battery state and internal resistance of each of the plurality of the batteries (21 to 23) and a predetermined lower limit voltage value, and set a minimum value among the obtained discharge current limitation values as a minimum discharge current limitation value.

[3] The battery control unit (3) according to [1], further including:
  a second control unit (34) configured to switch all the batteries (21 to 23) to the connection state after the battery (21 to 23) in the connection state becomes one by the first control unit (34) and before all the batteries (21 to 23) becomes the non-connection state by the first control unit (34), or after all the batteries (21 to 23) become the non-connection state by the first control unit (34), and then to switch the battery (21 to 23) to the non-connection state in order from the battery (21 to 23) determined to reach a discharge termination state.

[4] The battery control unit (3) according to [1], in which the discharge current limitation unit (5) determines that the discharge current limitation value falls below or is expected to fall below the discharge current consumed by a load (7) that receives a power supply from the battery (21 to 23), and the first control unit (34) switches the battery (21 to 23) having the minimum discharge current limitation value to the non-connection state before limiting the discharge current.

[5] The battery control unit (3) according to [3], in which a first assembled battery (BP1) and a second assembled battery (BP2) which include the plurality of batteries are connected in parallel, and
  the first control unit (34) switches each of the batteries (21 to 23) to the non-connection state based on a closed circuit voltage of each of the batteries (21 to 23) at a time of discharging, and the second control unit (34) switches all the batteries (21 to 23) to the connection state after making a total of the closed circuit voltages of the batteries (21 to 23) constituting the first assembled battery (BP1) equal to a total of the closed circuit voltages of the batteries (21 to 23) constituting the second assembled battery (BP2).

[6] The battery control unit (3) according to [3], in which a first assembled battery (BP1) and a second assembled battery (BP2) which include the plurality of batteries are connected in parallel, and
  the first control unit (34) switches the battery (21 to 23) to the non-connection state based on a charge state of the battery (21 to 23), increases a total charge state of the first assembled battery and the second assembled battery as an internal resistance of the first assembled battery and the second assembled battery is increased, and then the second control unit switches all the batteries (21 to 23) to the connection state.

[7] The battery control unit (3) according to [3], further including:
  a first diode (D1) and a second diode (D2) connected in series to the first assembled battery (BP1) and the second assembled battery (BP2), respectively, so that a battery discharge direction is a forward direction;
  a first bypass switch (SW1) and a second bypass switch (SW2) connected in series to the first assembled battery (BP1) and the second assembled battery (BP2), respectively, and connected in parallel to the first diode (D1) and the second diode (D1), respectively; and a third control unit (34) configured to turn on the first bypass switch (SW1) and the second bypass switch (SW2) when the discharge current limitation value is decreased and the total charge state of the first assembled battery (BP1) and the second assembled battery (BP2) become equal to each other by limiting the discharge current during a control period of the second control unit (34), in which
  the first assembled battery (BP1) and the second assembled battery (BP2) which include the plurality of batteries (21 to 23) are connected in parallel.

[8] A battery system (1), including:
  a plurality of batteries (21 to 23) connected in series to each other;
  a switching unit (31 to 33) configured to be provided for each of the plurality of batteries (21 to 23), and switch between a connection state in which the corresponding battery (21 to 23) is discharged and a non-connection state in which the corresponding battery (21 to 23) is not discharged;
  a discharge current limitation unit (5) configured to limit a discharge current flowing through the battery (21 to 23) in the connection state so as not to exceed a minimum discharge current limitation value among discharge current limitation values determined according to each battery state; and
  a first control unit (34) configured to switch the battery (21 to 23) to the non-connection state in order from the battery (21 to 23) having the minimum discharge current limitation value before the discharge current limitation unit (5) limits the discharge current.

According to the battery control unit and the battery system having configurations of [1] and [8], the first control unit switches the battery to the non-connection state in order from the battery having the smallest discharge current limitation value before the discharge current limitation unit limits the discharge current. Therefore, it is possible to extend a duration time for which desired power can be obtained without imposing the discharge current limitation.

According to the battery control unit having the configuration of the above [2], it is possible to easily set the minimum discharge current limitation value.

According to the battery control unit having a configuration of [3], after the first control unit changes the number of batteries in the connection state to one and before the first control unit switches all the batteries to the non-connection state, or after the first control unit switches all the batteries to the non-connection state, the second control unit switches all the batteries to the connection state, and then switches the battery to the non-connection state in order from the battery determined to reach the discharge termination state. As a result, the battery can be used until the discharge termination state is reached.

According to the battery control unit having a configuration of [4], the discharge current limitation unit determines that the discharge current required by the load that receives power supply from the battery exceeds the minimum discharge current limitation value, and the first control unit switches the battery having the minimum discharge current limitation value to the non-connection state before limiting the discharge current. As a result, it is possible to switch the battery to the non-connection state immediately before the discharge current limitation is imposed, and it is possible to further extend the duration time for which desired power can be obtained.

According to the battery control unit having a configuration of [5], the first control unit switches each of the batteries to the non-connection state based on the closed circuit voltage of each of the batteries at the time of discharging, and the second control unit switches all the batteries to the connection state after making a sum of the closed circuit voltages of the batteries constituting the first assembled battery equal to a sum of the closed circuit voltages of the batteries constituting the second assembled battery. Accordingly, it is possible to increase the possibility that the discharge current is obtained from both the first assembled battery and the second assembled battery during a control period by the second control unit.

According to the battery control unit having a configuration of [6], the first control unit switches the battery to the non-connection state based on the charge state of the battery, increases a total charge state of the first assembled battery or the second assembled battery as an internal resistance is increased, and then the second control unit switches all the batteries to the connection state. Accordingly, it is possible to further increase the possibility that the discharge current is obtained from both the first assembled battery and the second assembled battery during the control period by the second control unit.

According to the battery control unit having a configuration of [7], during the control period by the second control unit, when the current limitation value is decreased and the total charge state of the first assembled battery and the second assembled battery become equal to each other by limiting the discharge current, the first bypass switch and the second bypass switch are turned on. As a result, a loss due to the diode can be reduced.

According to the present invention, it is possible to provide a battery control unit and a battery system capable of extending a duration time for which desired power can be obtained without imposing a discharge current limitation.

What is claimed is:

1. A battery control unit comprising:
  a switching unit configured to be provided for each of a plurality of batteries connected in series to each other, and switch between a connection state in which the corresponding battery is discharged and a non-connection state in which the corresponding battery is not discharged;
  a discharge current limitation unit configured to send a signal to limit a discharge current flowing from the battery in the connection state so as not to exceed a discharge current limitation value that is smallest among discharge current limitation values which are determined by the discharge current limitation unit according to each battery state; and
  a first control unit configured to switch to the non-connection state from the battery having the discharge current limitation value before the discharge current is limited according to the signal.

2. The battery control unit according to claim 1, further comprising:

a setting unit configured to estimate a battery state and an internal resistance of each of the plurality of batteries in the connection state, obtain a discharge current limitation value for each of the plurality of batteries based on the estimated battery state and internal resistance of each of the plurality of batteries and a predetermined lower limit voltage value, and set a minimum value among the obtained discharge current limitation values as the discharge current limitation value.

3. The battery control unit according to claim 1, further comprising:
a second control unit configured to switch all the batteries to the connection state after a number of the batteries remaining in the connection state is determined by the first control unit to be only one and before all the batteries becomes the non-connection state by the first control unit, or after all the batteries become the non-connection state by the first control unit, and then to switch the battery to the non-connection state in order from the battery determined to reach a discharge termination state.

4. The battery control unit according to claim 3, wherein a first assembled battery and a second assembled battery which include the plurality of batteries are connected in parallel, and
the first control unit switches each of the batteries to the non-connection state based on a closed circuit voltage of each of the batteries at a time of discharging, and the second control unit switches all the batteries to the connection state after making a total of the closed circuit voltages of the batteries constituting the first assembled battery equal to a total of the closed circuit voltages of the batteries constituting the second assembled battery.

5. The battery control unit according to claim 4, further comprising:
a first diode and a second diode connected in series to the first assembled battery and the second assembled battery, respectively, so that a battery discharge direction is a forward direction;
a first bypass switch and a second bypass switch connected in series to the first assembled battery and the second assembled battery, respectively, and connected in parallel to the first diode and the second diode, respectively; and
a third control unit configured to turn on the first bypass switch and the second bypass switch when the discharge current limitation value is decreased and the total charge state of the first assembled battery and the second assembled battery become equal to each other by limiting the discharge current during a control period of the second control unit, wherein
the first assembled battery and the second assembled battery which include the plurality of batteries are connected in parallel.

6. The battery control unit according to claim 3, wherein a first assembled battery and a second assembled battery which include the plurality of batteries are connected in parallel, and
the first control unit switches the battery to the non-connection state based on a charge state of the battery, increases a total charge state as an internal resistance of the first assembled battery or the second assembled battery is increased, and then the second control unit switches all the batteries to the connection state.

7. The battery control unit according to claim 6, further comprising:
a first diode and a second diode connected in series to the first assembled battery and the second assembled battery, respectively, so that a battery discharge direction is a forward direction;
a first bypass switch and a second bypass switch connected in series to the first assembled battery and the second assembled battery, respectively, and connected in parallel to the first diode and the second diode, respectively; and
a third control unit configured to turn on the first bypass switch and the second bypass switch when the discharge current limitation value is decreased and the total charge state of the first assembled battery and the second assembled battery become equal to each other by limiting the discharge current during a control period of the second control unit, wherein
the first assembled battery and the second assembled battery which include the plurality of batteries are connected in parallel.

8. The battery control unit according to claim 1, wherein the discharge current limitation unit determines that the discharge current limitation value falls below or is expected to fall below the discharge current consumed by a load that receives a power supply from the battery, and
the first control unit switches the battery having the discharge current limitation value to the non-connection state before limiting the discharge current.

9. A battery system comprising:
a plurality of batteries connected in series to each other;
a switching unit configured to be provided for each of the plurality of batteries, and switch between a connection state in which the corresponding battery is discharged and a non-connection state in which the corresponding battery is not discharged;
a discharge current limitation unit configured to send a signal to limit a discharge current flowing from the battery in the connection state so as not to exceed a discharge current limitation value that is smallest among discharge current limitation values determined by the discharge current limitation unit according to each battery state; and
a first control unit configured to switch to the non-connection state from the battery having the minimum discharge current limitation value before the discharge current is limited according to the signal.

* * * * *